Oct. 8, 1963 W. J. RACE 3,106,098

RADIO CONTROL MECHANISM

Filed Nov. 15, 1961

INVENTOR.

WILLIAM J. RACE

BY Mueller & Aichele

ATTYS.

United States Patent Office 3,106,098

Patented Oct. 8, 1963

3,106,098
RADIO CONTROL MECHANISM

William J. Race, Franklin Park, Ill., assignor to Motorola, Inc., Chicago, Ill., a corporation of Illinois Filed Nov. 15, 1961, Ser. No. 152,436
6 Claims. (Cl. 74—10.8)

This invention relates to control apparatus and more particularly to radio control apparatus which is adapted to be mounted in a variety of different supporting structures such as the dashboards of automobiles, trucks, airplanes or the like.

Most auto radios are positioned behind the dashboard of a car with a pair of shafts for manual volume and tuning adjustment extending through apertures formed in the dashboard. Since many automobiles are sold with radio receivers already installed, substantially all cars manufactured are provided with a set of apertures in the dashboard for a radio receiver. However, the relative positions of these apertures varies somewhat between different makes and models of automobiles. For this reason, one who buys an auto without a radio and desires to have a receiver installed subsequently must purchase a model in which the relative positions of the control shafts thereof corresponds to the apertures provided in the dashboard of his car. Manufacturers of auto radios must make different models to fit the various dashboard configurations, and the provision of a substantial number of different models necessarily adds to overall manufacturing costs.

In the past, receivers have been provided in which the position of the volume control shaft is adjustable. This can be accomplished easily since the volume control potentiometer is connected to the remainder of the receiver only electrically by flexible wiring. However, substantial mechanical problems must be overcome to provide a control shaft that is capable of operating the mechanical tuning control means from a number of different positions since the position of the body of the tuner must remain fixed. Upon the advent of transistorized receivers it became an additional necessity to provide a variable control shaft tuning mechanism which occupies a minimum of receiver depth in order to fully utilize the economy of space made available by transistors.

Accordingly, it is an object of the present invention to provide a radio receiver that can easily be installed upon a variety of different makes of automobiles or similar vehicles.

It is a further object of the invention to provide a manual tuning mechanism for a radio receiver having a manually actuated control shaft which may be mounted in a variety of different positions with respect to the main body of the tuner and which tuning mechanism occupies a minimum of space.

It is another object of the invention to provide a low cost adjustable tuning mechanism which affords reliable control in all mounted positions.

A feature of the invention is a control shaft slidably mounted in a slot in the receiver face plate and having on its interior end a crown gear, or equivalent torque transmitting means, engaging an elongated idler and slidable along substantially the whole length of the idler.

A further feature is the provision in the above described device of a tuner shaft driven off the idler.

In a particular form of the invention the control shaft is slidably mounted in a slot in a face plate of a receiver by means of a mounting bushing and threaded fastener. A crown gear or its equivalent is fixed to the control shaft and adapted to engage an elongated idler. The idler is so positioned that its axis of rotation is parallel to the slot in the face plate of the receiver and to a radius of the crown gear. This enables the crown gear to remain in driving engagement with the idler regardless of the position which the control shaft is locked in the slot in the face plate. The idler in turn cooperates with a rotatable member affixed to a tuner drive shaft and the tuner drive shaft thereby operates the variable tuning element of the receiver.

Figure 1:
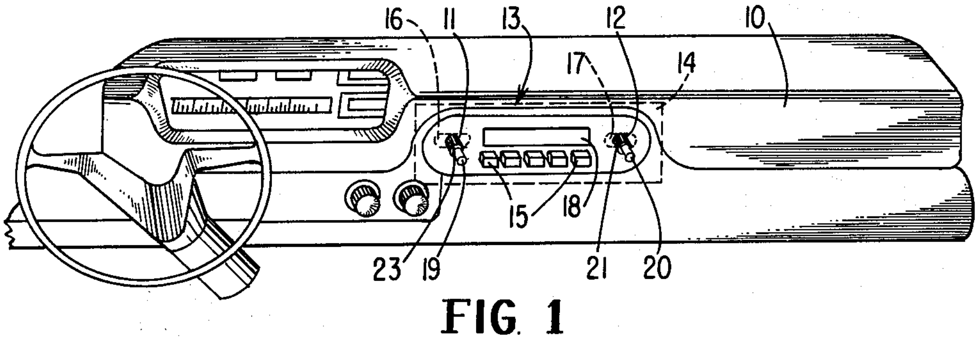
FIG. 1 is a perspective view illustrating the mounting of a radio receiver having a tuning mechanism constructed in accordance with the invention.

FIG. 1 shows a typical automobile having a dashboard 10 with spaced apart openings 11 and 12 formed therein to accommodate mounting bushings 21 and 23 and manual control shafts 19 and 20 for a radio receiver mechanism, generally indicated in phantom at 13. Mounting bushings 21 and 23, as explained later, serve to mount the receiver in the dashboard by the use of appropriate nuts. Also indicated are tuner pushbuttons 15 and dial 18 in their relative positions in the dashboard 10. The front plate 14 of the receiver is provided with a pair of horizontal slots 16 and 17 generally oval in shape and approximately one inch long. The spacing between dashboard openings 11 and 12 will vary sufficiently among the different makes of cars so that no one receiver will have its control shafts positioned to fit all makes but the variation in spacing is not so great that the openings 11 and 12 will not fall within the span of horizontal slots 16 and 17.

Figure 3:
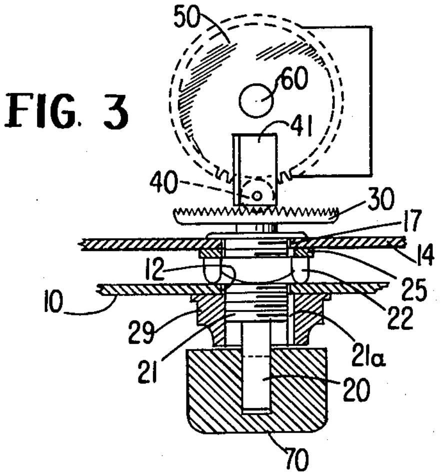
FIG. 3 is a side elevation of the embodiment of FIG. 2.

Referring now to FIG. 3, the control shaft 20 of the receiver tuner is fastened in dashboard 10 through opening 12 therein by means of mounting bushing 21 and panel nut 29. The control knob 70 is secured on the end of control shaft 20. Control shaft 19 and bushing 23 are fixed in dashboard 10 through opening 11 in a similar manner, thereby providing mounting support for receiver 10. In order to accommodate control shaft 20 to variations in spacing between dashboard openings 11 and 12, control shaft 20 must be capable of movement relative to opening 11 and dial 18 to insure proper alignment.

To accomplish this, locking nut 22, which secures control shaft 20 and mounting bushing 21 in the face plate 14 of the receiver, is loosened enabling movement of control shaft 20 to the desired position in the slot 17 in the face plate 14. Locking nut 22 is then tightened securing the position of control shaft 20 in slot 17. A washer 25 is provided between nut 22 and face plate 14 to provide a bearing surface for nut 22 which spans slot 17. Mounting bushing 21 is prevented from turning in slot 17 during tightening of locking nut 22 by providing bushing 21 with a flat portion 21*a* which bears on the edge of slot 17. It should be noted that locking nut 22 may be loosened from the outside of the receiver housing allowing alteration of the position of the control shaft with a minimum of effort.

Figure 2:
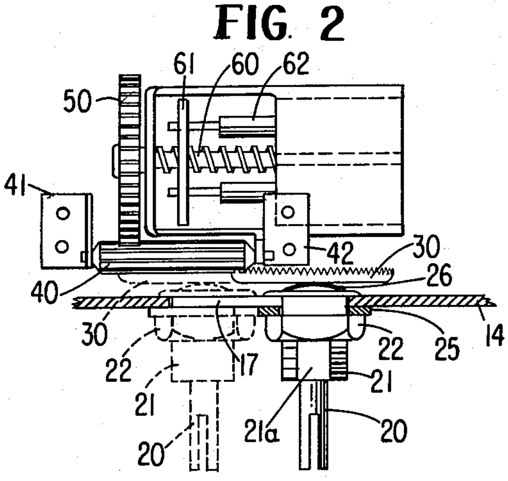
FIG. 2 is a plan view of the tuner driving mechanism of the invention.

As may be seen in FIGS. 2 and 3, crown gear 30 is fixed to the interior end of control shaft 20 which meshes with elongated pinion gear 40. Pinion gear 40 is secured by mounting brackets 41 and 42 and is so positioned that its axis of rotation is parallel to the horizontal slot 17 and to a radius of the crown gear 30. By locating the pinion gear in this manner, space is kept at a minimum, and the crown gear remains in engagement with gear 40 regardless of the position in the horizontal slot in which the control shaft is mounted. The extent to which the crown gear or disc, and hence the control shaft may be moved is indicated in phantom in both figures. Crown gear 30 is loaded against pinion gear 40 by spring washer 26 to reduce backlash. Cooperating with the pinion gear 40 is the driving gear 50 which is fixed to an end of the wormed tuner shaft 60. Driving gear 50 may be a helical gear or a spring bias gear to eliminate backlash. Tuner shaft 60 is located at right angles to the control shaft 20 thereby saving additional space. The worm gear on tuner shaft 60 engages tapped plate 61 to operate tuner slugs 62 within associated tuner inductors.

Figure 4:
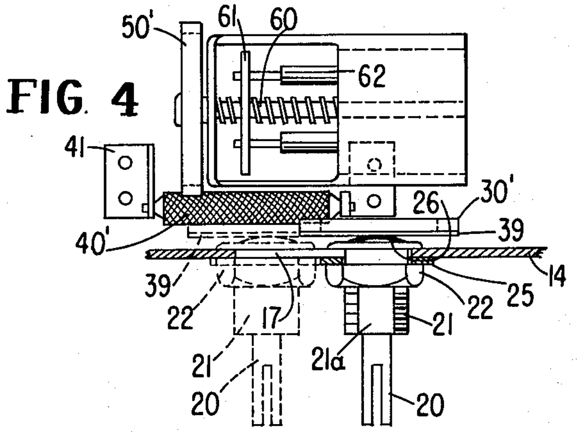
FIG. 4 is a plan view of a modified embodiment of the invention.

In FIG. 4 another version of the invention may be seen. A disc 39 is fixed to the interior end of the control shaft 20. Mounted at the radial extremity of a face of the disc 39 is an annular rubber ring 30′. Ring 30′ engages and drives the knurled idler 40′, which is mounted in the same manner as the pinion gear 40 of FIG. 2. Loading of ring 30 against idler 40 is accomplished by spring washer 26. This arrangement enables the rubber ring 30′ to engage the knurled idler 40′ at any position in which the control shaft 20 may be mounted in the slot 17. The knurled idler 40′ is in driving engagement with a rubber rimmed wheel 50′ which is fixed to an end of the tuner shaft 60.

Other similar cooperating devices may be arranged in the manner of the gears of FIG. 2 in order to transmit torque from the control shaft 20 to the tuner shaft 60 while at the same time allowing mounting of the control shaft at a variety of positions. Torque can be transmitted from idler 40′ to tuner shaft 60 by means of a rubber faced dish type disc located on the end of tuner shaft 60 and having one side in engagement with idler 40′ in a manner similar to the engagement of disc 39 with the idler. The same arrangement can be accomplished for the embodiment of FIG. 2 by means of a crown gear located as is the dish type disc of the previous arrangement.

Thus, the tuning system of the invention is generally low in cost, reliable of operation, and occupies a minimum of space between the tuning mechanism 61 and the front panel 14 of the receiver 13. Furthermore, it provides adaptability for use in various types of automobiles by means of a simple, easy made adjustment.

I claim:

1. An adjustable tuning mechanism for radio receivers comprising a control shaft having a mounting bushing thereon, a receiver face plate having a slot therein, said mounting bushing being slidably positioned in said slot and secured therein by locking means, a crown gear secured to said control shaft, an elongated cylindrical pinion gear engaging said crown gear and having an axis of rotation parallel to said slot and to a radius of said crown gear, a driving gear cooperating with said pinion gear, and a tuner shaft fixed to said driving gear and located perpendicular to said control shaft, said tuner shaft being adapted to operate the tuner of a receiver.

2. An adjustable tuning mechanism for radio receivers comprising a control shaft having a mounting bushing thereon, a receiver face plate having a slot therein, said mounting bushing being slidably inserted in said slot and secured therein by locking means, a disc secured to said control shaft and having mounted on one face thereof a resilient ring, an elongated cylindrical knurled idler engaging said ring and having an axis of rotation parallel to said slot and to a radius of said disc, a driving wheel cooperating with said knurled idler, and a tuner shaft fixed to said driving wheel and located perpendicular to said control shaft, said tuner shaft being adapted to operate the tuner of a receiver.

3. An adjustable tuning mechanism for use in automobile radio receivers comprising a control shaft having a mounting bushing thereon, a receiver face plate having a slot therein, said mounting bushing being slidably inserted in said slot and secured therein by locking means, a first torque transmitting means secured to said control shaft, an elongated idler engaging said first torque transmitting means and having an axis of rotation parallel to said slot and to a radius of said first torque transmitting means, a second torque transmitting means cooperating with said idler, and a tuner shaft fixed to said second torque transmitting means and located perpendicular to said control shaft, said tuner shaft being adapted for operating the tuner of a receiver.

4. An adjustable tuning mechanism for use in a radio receiver for vehicles of different ones which have variations in the spacing between mounting apertures, said mechanism providing for movement of a control shaft and mounting bushing of the mechanism relative to one or more other elements of the receiver which also fit through such mounting apertures for allowing adaptation of the receiver to such variations in spacing, said mechanism including in combination a receiver face plate having an elongated slot therein, a control shaft with a bushing therefor slidably mounted in said slot, locking means for securing said bushing at any position in said slot, an elongated idler having an axis of rotation parallel to said elongated slot, torque transmitting means secured to said control shaft and slidable therewith while engaged with said idler, and tuning means driven by said idler.

5. An adjustable tuning mechanism for use in a receiver comprising a receiver face plate having an elongated slot therein, a control shaft with a bushing therefor slidably mounted in said slot, locking means for securing said bushing at any position in said slot, an elongated idler having an axis of rotation parallel to said elongated slot, torque transmitting means secured to said control shaft and slidable therewith while engaged with said idler, and tuning means driven by said idler.

6. The mechanism described in claim 5 wherein said idler is in a fixed position and engageable throughout its entire length by said torque transmitting means, and said torque transmitting means having an axis of rotation perpendicular to the axis of rotation of said idler.

References Cited in the file of this patent

UNITED STATES PATENTS 883,431 Thornburg ............ Mar. 31, 1908